(12) United States Patent
Gersch et al.

(10) Patent No.: US 9,586,369 B2
(45) Date of Patent: Mar. 7, 2017

(54) METHOD FOR COATING OBJECTS, IN PARTICULAR SUCH OBJECTS THAT HAVE BEEN MANUFACTURED BY A GENERATIVE MANUFACTURING METHOD

(75) Inventors: Mandy Gersch, Ulm (DE); Ilhan Tuncer, Ulm (DE); Andreas Hotter, Rosenheim (DE); Florian Pfefferkorn, Munich (DE)

(73) Assignee: EOS GMBH ELECTRO OPTICAL SYSTEMS, Krailling (DE)

( * ) Notice: Subject to any disclaimer, the term of this patent is extended or adjusted under 35 U.S.C. 154(b) by 784 days.

(21) Appl. No.: 13/878,298

(22) PCT Filed: Oct. 10, 2011

(86) PCT No.: PCT/EP2011/067649
§ 371 (c)(1),
(2), (4) Date: May 3, 2013

(87) PCT Pub. No.: WO2012/045887
PCT Pub. Date: Apr. 12, 2012

(65) Prior Publication Data
US 2013/0330470 A1     Dec. 12, 2013

(30) Foreign Application Priority Data

Oct. 8, 2010 (DE) .................. 10 2010 042 230

(51) Int. Cl.
| | |
|---|---|
| *B05D 1/12* | (2006.01) |
| *B29C 71/00* | (2006.01) |
| *C23C 24/04* | (2006.01) |
| *B05D 1/28* | (2006.01) |
| *B05D 3/12* | (2006.01) |

(52) U.S. Cl.
CPC ............... *B29C 71/00* (2013.01); *B05D 1/12* (2013.01); *B05D 1/28* (2013.01); *C23C 24/04* (2013.01); *B05D 3/12* (2013.01); *B05D 2201/02* (2013.01)

(58) Field of Classification Search
None
See application file for complete search history.

(56) References Cited

U.S. PATENT DOCUMENTS

| | | | |
|---|---|---|---|
| 4,517,248 A | 5/1985 | Kik et al. | |
| 2001/0043990 A1 | 11/2001 | Chong et al. | |
| 2006/0177573 A1* | 8/2006 | Pui ........................ | A61L 31/16 427/180 |

(Continued)

FOREIGN PATENT DOCUMENTS

| | | |
|---|---|---|
| DE | 102006042374 A1 | 3/2008 |
| EP | 0069418 A1 | 1/1983 |

(Continued)

OTHER PUBLICATIONS

Machine translation of DE 10 2006 042 374 A1.*

*Primary Examiner* — Shamim Ahmed
*Assistant Examiner* — Bradford Gates
(74) *Attorney, Agent, or Firm* — Laurence A. Greenberg; Werner H. Stemer; Ralph E. Locher

(57) ABSTRACT

A method for coating the surfaces of three-dimensional objects with a coating agent is provided, which method is characterized by a blasting of the three-dimensional object, wherein a grainy blasting material that has been mixed with the coating agent is used as blasting medium.

14 Claims, 2 Drawing Sheets

(56) References Cited

U.S. PATENT DOCUMENTS

| | | | |
|---|---|---|---|
| 2006/0204780 A1* | 9/2006 | Vega | C23C 24/02 |
| | | | 428/687 |
| 2008/0248222 A1* | 10/2008 | Ohara | B32B 15/01 |
| | | | 428/34.6 |
| 2009/0098286 A1 | 4/2009 | Lui et al. | |
| 2010/0040905 A1* | 2/2010 | Fukuike | C09C 1/62 |
| | | | 428/681 |
| 2010/0219218 A1* | 9/2010 | Kogel | B29C 41/06 |
| | | | 224/400 |
| 2011/0123383 A1 | 5/2011 | Fuwa et al. | |

FOREIGN PATENT DOCUMENTS

| | | |
|---|---|---|
| EP | 2060343 A1 | 5/2009 |
| GB | 2194178 A | 3/1988 |
| WO | 2008154465 A1 | 12/2008 |

* cited by examiner

METHOD FOR COATING OBJECTS, IN PARTICULAR SUCH OBJECTS THAT HAVE BEEN MANUFACTURED BY A GENERATIVE MANUFACTURING METHOD

BACKGROUND OF THE INVENTION

Field of the Invention

The invention refers to a method for coating three-dimensional objects, in particular such objects that have been generated by a generative manufacturing method.

In order to finish an object or workpiece often its surface is provided with a coating. Here, the coating can lead to diverse advantages: on the one hand the surface of the workpiece can be protected against corrosion. Further, the coating may have a decorative purpose. Finally, particular properties such as a modified electrical conductivity may be given to the workpiece surface.

Varnishes dominate as coating materials that are used. Predominantly they are applied in liquid form onto the workpiece surface. Here, a layer can be applied by painting, rolling, sputtering, spraying or by dipping. When generating a homogeneous layer of varnish, the flow properties have to be taken into account. Usually, a professional application requires a specific knowledge.

In a liquid varnish the actual coating agent is dissolved in a solvent, which solvent volatilizes after the application of the varnish. Depending on the type of solvent this leads to an increased burden on the environment and moreover to an extension of the actual coating process due to the drying time. Though the drying time can be shortened by the use of a drying apparatus, there is a trade-off due to an increased energy expenditure.

Due to the disadvantages that accompany the use of liquid coating materials, recently powder varnishes have become more common. When a coating powder is applied, the workpiece surface is set to a predefined potential (usually ground) and the coating material in powder form is charged up to a potential that differs from the potential of the workpiece surface. Usually a specific spray gun is used for this purpose. In such a spray gun the powder is charged electrostatically or tribostatically, followed by a scattering of the powder by means of compressed air, so that the powder is electrostatically attracted to the workpiece surface. Then the workpiece, which has been coated in such a way, is placed in an oven in order to melt the powder particles and thus obtain a compact, homogeneous coating. This requires a sufficient temperature resistance of the workpiece.

As is already apparent from the description of the process, a powder coating method can be applied only when the parts that are to be coated are electrically conductive. Therefore, the method is usually used for coating metal parts. A further disadvantage is that Faraday rooms may form locally due to the shape of the workpiece to be coated. These Faraday rooms prevent the insertion of the powder varnish, so that surface regions in these Faraday rooms are not coated.

Usually a varnish is applied in a spray booth, in which appropriate climate conditions are provided and in which a controlled removal of the solvent vapours and of dusts is guaranteed. Such a spray booth is a discrete processing station, which is normally strictly separated from the place where the workpiece is generated in order to avoid a contamination of the place where the workpiece is generated with the coating agent.

In practice, workpieces that are removed from a manufacturing station, are not directly fed to a coating station. Usually, a prior cleaning or surface pre-treatment of the workpiece is necessary. Here, the cleaning can occur chemically or can also be effected by a mechanical treatment. Here, typical types of mechanical treatment are grinding, brushing or blasting of the workpiece surface. This makes it necessary to set up a further processing station that specifically serves for a pre-treatment of the surfaces.

However, due to a multitude of processing stations the space that is required for a manufacturing apparatus increases. Furthermore, also the complexity is increased due to the necessary transport of the workpiece from station to station and due to the necessary physical separation of the individual stations from each other.

In the following selective laser-sintering is described as an example for a method for manufacturing a workpiece or three-dimensional object by making reference to FIG. 1.

The laser-sintering device shown in FIG. 1 has a frame 1, which is open to the top and has therein a support 5, which can be moved in a vertical direction and which supports the three-dimensional workpiece 3 to be manufactured. The upper portion 2 of the frame surrounds a build region 6. Preferably, the frame 1 and the support 5 form a replaceable swap container that can be removed from the laser-sintering device. The support 5 is connected to a lifting mechanism 4, which, at least below the plane of the build region 6 moves the support 5 in a vertical direction, so that the upper surface of a respective powder layer that is to be solidified lies in the plane of the build region 6. An application device 10 is provided for applying a layer of a powder material 11. All laser-sinterable powders such as plastic powders, metals, ceramics, foundry sand and composite materials can be used as powder material 11.

In order to generate the workpiece the application device 10 is moved at a predetermined height above the build region 6, so that a layer of the powder material 11 having a predefined height (thickness) is applied onto the support 5 or that layer that was most recently solidified. By means of an irradiation device in the form of a laser 7 that generates a laser beam 8 and by means of a deflection device 9 that is able to focus the laser beam onto arbitrary positions in the build region 6 the powder material 11 is selectively solidified at those positions of the build region 6 that correspond to a cross-section of the object 3 to be manufactured. The whole build process is controlled by a control unit 40 as follows:

First, by means of the lifting mechanism 4 the support 5 is lowered until its upper surface lies below the plane of the build region 6 by the desired thickness of the first powder layer. Then, by the application device 10 the first layer of the powder material 11 is applied onto the support 5 and smoothened. Afterwards, the control unit 40 controls the deflection device 9 such that the deflected laser beam 8' selectively hits the layer of powder material 11 at those positions that shall be solidified. Thereby the powder material 11 is solidified and sintered, respectively, at these positions, so that there the three-dimensional object 3 forms.

In a next step the support 5 is lowered by the desired thickness of the next layer by means of the lifting mechanism 4. The next layer of powder material is applied by the application device 10, is smoothened and a selective solidification by means of the laser beam 8' is carried out. This step is repeated until the desired workpiece 3 has been finished. Afterwards the loose powder that surrounds the workpiece is removed and the workpiece is placed in a blast cabinet or blast room for a thorough removal of adhering powder.

If workpieces shall be generated that have different colours or different surface properties (surface functions), one might basically think of two different procedures:

A) Additives such as colour pigments can be contained in the laser-sintering powder before it is solidified. Here, a disadvantage is that usually for dark and brilliant colours a concentration of additives is necessary, which is so high that the properties of the laser-sintering powder are modified such that the suitability of the powder for a laser-sintering is effected. If, moreover, the laser-sintering powder is manufactured such that the additives are added before a generation of the powder particles, one has to expect severe effects onto the manufacturing process. When the additives are mixed with the melt and subsequently a milling or grinding is carried out, the grain size distributions and grain shapes that are preferable for a laser-sintering powder are usually not obtained. Finally, the uniformity of the part colour and the homogeneity, respectively, depend on the process parameters in the laser-sintering process. In particular, a reduction in the resolution of details or the quality of the surfaces of the workpiece may occur depending on the concentration of additives. One should also have in mind the increased cleaning effort of a laser-sintering device after the use of a specific laser-sintering powder. The mentioned disadvantages are not limited to the addition of colour additives but are equally present when adding filler materials and reinforcing materials such as aluminium powders or carbon fibres or when adding additives that increase the conductivity.

B) Due to the disadvantages mentioned before, usually a workpiece that has been generated by laser-sintering is afterwards coated or coloured by means of a dip coating or treatment in a spray booth. Again the increased complexity due to the presence of several different processing stations, which was described further above, becomes apparent.

From EP 0 069 418 B1 a method for applying a coating onto an iron-containing metal substrate is known, in which the substrate is subjected to a treatment by a blasting medium, wherein a beam that contains a blasting medium and a further beam that contains a layer-forming binding agent are simultaneously applied to a substrate.

BRIEF SUMMARY OF THE INVENTION

In view of the before-mentioned problems of the prior art it is an object of the invention to provide an alternative method for coating workpieces, which method can be carried out more effectively than the methods of the prior art and also a powder that is suited therefore.

The object is achieved by a method as claimed and a powder as claimed. Further developments of the invention are described in the dependent claims.

According to the inventive method an object is blasted by a blasting medium containing a coating agent. In doing so, an abrasion-resistant coating can be applied without having the above-mentioned disadvantages such as environmental problems due to solvents and a necessary drying time in the case of liquid varnishes or the need of a heating of the object surfaces for melting the coating powder particles in the case of powder varnishes. In particular, only one process step is required for cleaning a surface and applying a coating.

In particular, the inventors have found that by the inventive method a coating technique is provided that seems to work based on completely different principles than the known coating techniques. A preliminary explanation of such principles is as follows:

When the blasting medium, which contains the blasting particles and the coating agent, hits the surface, the coating agent is applied to the surface and is "pounded" into the surface by subsequent hits of blasting particles. One might e.g. think of a rough surface having hills and valleys, wherein the coating agent is applied in the valleys and then covered by the material from the hills when the surface is levelled due to the hits by the blasting particles. Alternatively, if it is assumed that the coating agent is at first applied on the hills, then these hills might be bent into the valleys by the stream of blasting particles, which is smoothing the surface.

In any case by the inventive method it is not necessary to add any binding agent (binder) to the coating agent or to apply any binding agent onto the surface to be coated. Even without any binding agent and even without any melting of the coating layer an abrasion-resistant coating can be provided.

The invention is described in more detail in the following embodiments.

DESCRIPTION OF THE INVENTION

In the following description of embodiments the term "blasting medium" designates a material (preferably used in a blast cabinet or blast room), which by means of pressure (the blasting pressure) is propelled (shot) towards an object surface.

The term "coating agent" designates the material, with which the surface of a workpiece is coated. The term "blasting material" designates the grainy material fraction in the blasting medium that induces mechanical modifications of the surface when hitting the object surface. The term "coating agent substrate" designates a material having grains to which pigments etc., with which an object shall be coated, adhere. This material, which is a carrier for the pigments, etc., can be at the same time a blasting material, however, this need not necessarily be the case.

Figure 1:
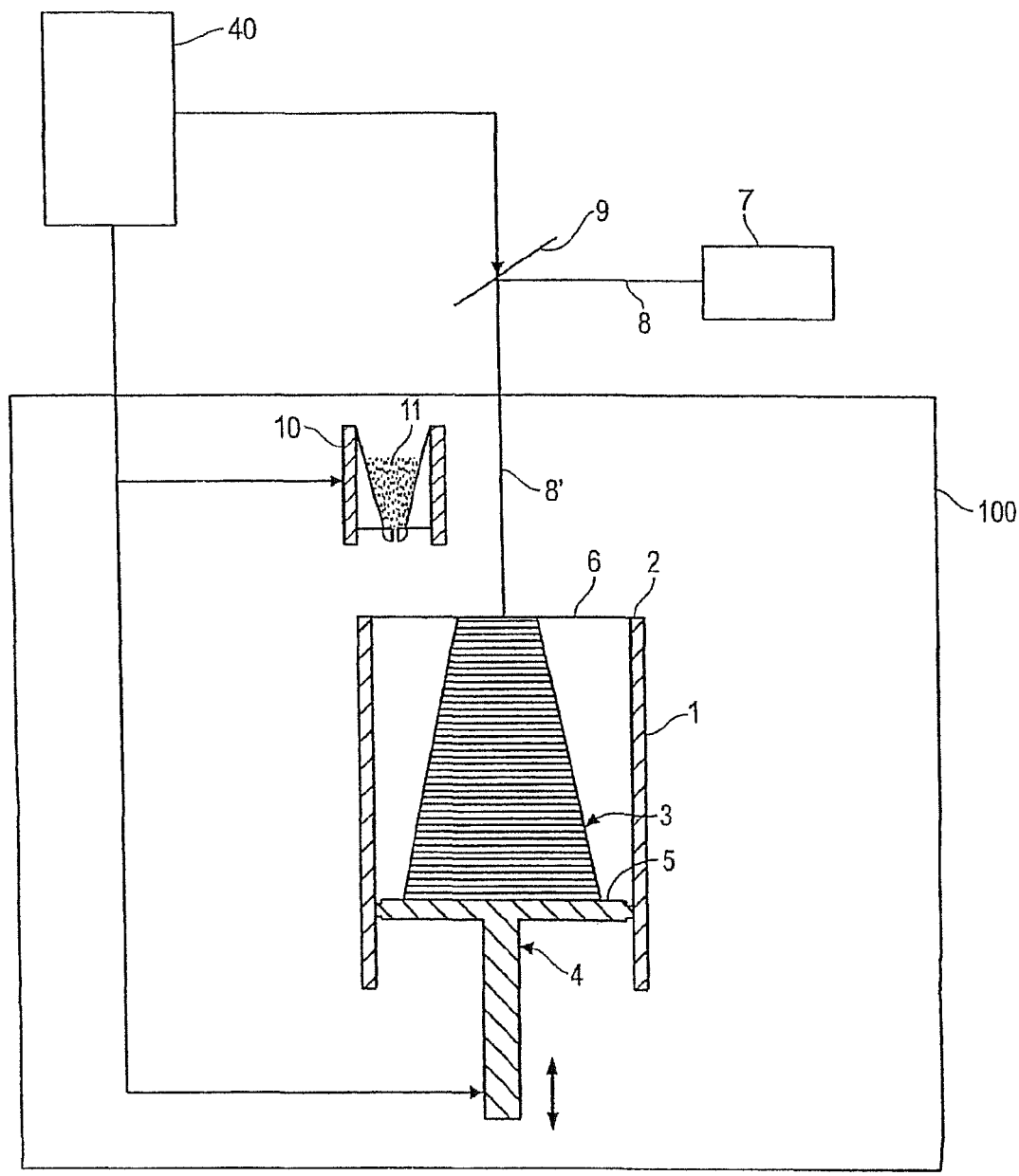
FIG. 1 shows an illustration of a known laser-sintering device for generating workpieces.
Figure 2:
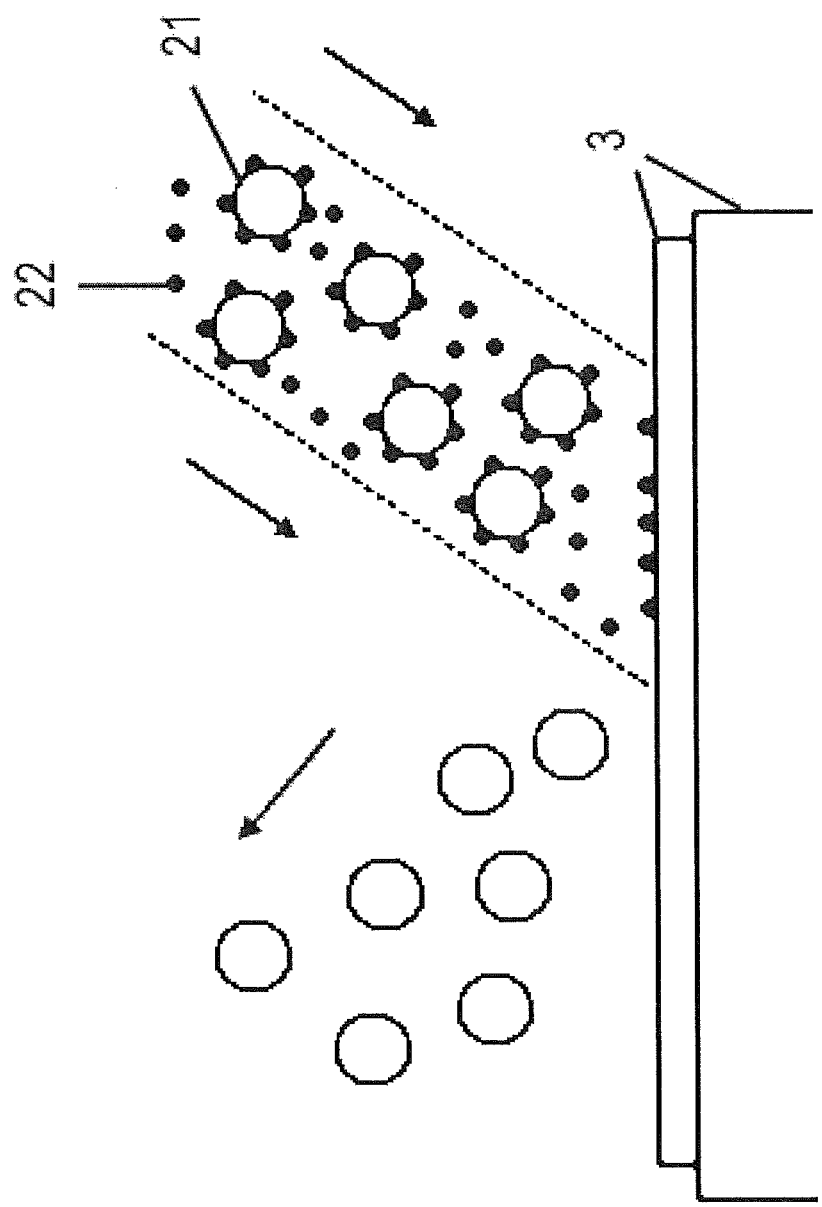
FIG. 2 is a schematic illustration showing the coating process according to the invention.

Description of a First Embodiment:

The product PrimeCast® 101 of EOS GmbH is a well-known powder that is suitable as building material for the manufacturing of three-dimensional objects by means of laser-sintering. This powder consists of a mixture of graphite with a grainy polystyrene. It was found that this material is also particularly suitable for a subsequent coating of surfaces of workpieces, specifically a colouring:

Here, the workpiece to be coated (for example a laser-sintered part made from polyamide 12) is placed in a customary blast cabinet. Then, as illustrated in FIG. 2, a blasting process is carried out using the polystyrene balls that have been mixed with graphite powder as blasting medium. In FIG. 2 the large circles 21 represent the polystyrene balls whereas the small circles 22 represent the graphite particles. The process works especially well for a blasting pressure that is larger than 4 bar. The polystyrene balls can e.g. have a mean diameter of approximately 80 μm.

As illustrated in FIG. 2 graphite, which serves as coating agent, on the one hand is transported to the workpiece 3 by the polystyrene balls, which serve as blasting material, and on the other hand is literally "pounded" into the surface by the constant impact of polystyrene balls onto the workpiece surface. This effect can be increased by an increase of the blasting pressure or by adding glass beads (consisting of sodium glass having a grain size between approximately 70 to 110 μm). The silvery-grey colour layer and functional layer, respectively, that forms in this way on the surface of the workpiece has a uniform coloration and is rather thin, so that the details of the object are not seriously affected. The graphite coating leads to a reduction of the surface resistance of the three-dimensional object down to approximately 1 kOhm.

Description of a Second Embodiment:

Laser-sintered parts made of PA 2200 (polyamide 12) or made of EOS PEEK HP3 can be provided with a homogeneous, abrasion-resistant coating in black colour as is described in the following:

The parts are placed in an injector blast cabinet. A blasting medium consisting of 6 parts glass beads having a grain size of approximately 40-80 μm and 1 part coating agent, which consists of PA 2200 powder (d50=56 μm) as coating agent substrate and a 5% proportion of the anorganic black pigment PK3095 of the company Ferro GmbH, is applied using blasting pressures of 4 bar and 6 bar, respectively. (The grain sizes were obtained by means of laser diffraction/wet dispersion using a CILAS 1060).

The black pigment was mixed into the PA 2200 powder in a customary discontinuous mixer (e. g. FM L 40 of the company Henschel Industrietechnik GmbH) having fast-rotating blades at 1000 rotations per minute for four minutes.

In particular for objects that have been manufactured by means of powder-based generative manufacturing methods it is appropriate to use as coating agent a mixture described in the above embodiment 2, wherein colour pigments and/or functional pigments intended for the coating are worked into a powder applied in said manufacturing method by means of shear mixing. Here, the powder that is used as coating agent substrate need not necessarily be identical to the powder from which the object to be coated had been manufactured.

When 10% to 30% of such a mixture is added to a blasting material, low-dust blasting mediums can be created and uniform and abrasion-resistant coatings can be generated on the workpieces.

Besides graphite and colorants in powder form carbon black, in particular electrically conductive carbon black and functional pigments in powder form can be used.

It can be generally said that prima facie all grainy materials can be used as blasting materials, thus in particular plastic, glass, ceramics, stone and steel in powder form, as granules or as balls.

The inventive method is not only suitable for a colouring of workpieces. Rather it is generally suitable for coating processes that serve for a conservation of workpiece surfaces or that shall change the properties thereof.

The above-described method is not only applicable to workpieces made of polyamide. Rather it can be applied also to workpieces that are made from other plastics, in particular such workpieces that have been manufactured by means of generative manufacturing methods.

By means of the blast pressure the coating agents are applied onto the part surface. Usually this leads to abrasion-resistant coatings. Blasting conditions that are optimal for a layer application depend on the coating agent that is used, on the blasting material and on the material of the workpiece.

Usually the blast pressure will be larger than 3 bar for a mean particle size of the grains of the blasting material between 40 and 110 μm.

Furthermore, it was found that the abrasion-resistance is particularly good, when the workpiece surface has a certain roughness. Therefore, depending on the roughness of the workpiece surface it may be appropriate to roughen the same. Furthermore, in case there is a particular mechanical wear of the coated surfaces, it may be appropriate to provide the same with an additional sealing layer (e. g. clear varnish), which is applied in a known way following the coating process.

Moreover, it is also conceivable that different surface regions of a workpiece are coated with different coating agents or that different surface regions are coloured differently. In order to do this, several blasting processes are carried out using different coating agents/colours. Here, those surface regions that are not to be coated are respectively covered by one or more masks.

The described method according to the invention and its modifications are particularly suitable for a treatment of workpieces that were obtained by means of a generative manufacturing method. Here, it is particularly referred to methods, in which the workpiece is generated from a solid phase, which means by melting, sintering and solidification of powders and granules. The inventive method works especially well subsequent to generative manufacturing methods that lead to workpieces having a rough surface.

Here, generative manufacturing methods are in particular all methods, in which a three-dimensional object is built layer-wise such as the above-described selective laser sintering or a mask sintering or stereolithography or a three-dimensional printing method, in which printing method a powder layer is selectively solidified by means of a binder, or a LOM (Laminated Object Manufacturing) method, in which layers of an object to be manufactured are laminated onto each other. All these methods may lead to object surfaces that are not smooth and thus are well-suited for the application of the inventive method, either due to the material, e.g. powder, that is used or due to a layer-wise formation that uses layer thicknesses, which are in the micrometer range or even smaller.

Description of a Third Embodiment:

When generating three-dimensional objects from a powder that has a black colour, where it is intended that also the finished objects are black, often the following problem occurs:

The colour of the solidified material is only black, if the powder has been completely melted by the incident radiation, e.g. a laser beam. In case the powder particles do not completely melt during the solidification, the solidified material is not black and the surface of the finished object is not deep black but rather shows some "fogging".

In such a situation the inventive method can lead to perfectly dark objects: An object is blasted using a blasting medium containing black pigments. In particular, particles of the powder that was used for generating the object may be used as coating agent substrates. However, this is not a necessary requirement.

Thus, by the inventive method it becomes possible to generate by a generative manufacturing method also objects, for which it is very important that they have a specific colour, which objects in the past could not be manufactured in such a way due to unintended colour deviations.

The invention claimed is:

1. Method for coating three-dimensional objects, which have been manufactured layerwise from a powder material by means of a generative manufacturing method, with a coating agent, wherein a binder-free coating is applied onto a surface of such three-dimensional object by blasting the surface with a blasting medium containing the coating agent characterized in that the objects to be coated were manufactured from a plastic powder as building material and in that the blasting medium contains said plastic powder that was used as building material for manufacturing said objects to be coated.

2. Method according to claim 1, in which a color powder, functional pigments, carbon black, graphite or pure color pigments or a combination thereof are used as coating agents.

3. Method according to claim 1, wherein said plastic powder serves as coating agent substrate.

4. Method according to claim 1, wherein powders, granules or balls are used as grainy blasting material in said blasting medium.

5. Method according to claim 1, wherein in a further process step before the blasting process the surface of the three-dimensional object is roughened.

6. Method according to claim 1, wherein in a further process step after the blasting process a surface sealing agent is applied onto the surface of the three dimensional object.

7. Method according to claim 1, in which said generative manufacturing method, by which the object to be coated was manufactured, is a selective powder sintering method.

8. Method according to claim 1, in which partial regions of the object are covered by one or more masks and in which several blast processes are carried out using blasting mediums that contain different coating agents.

9. Method according to claim 1, in which said blasting medium contains a blasting material, wherein the coating agent adheres to the surfaces of the grains of the blasting material.

10. Method according to claim 9, in which said blasting medium furthermore contains a second blasting material, wherein said coating agent does not adhere to the surfaces of the grains of said second blasting material.

11. A method for applying a coating to an object which has been manufactured layerwise from a plastic powder by means of a generative (additive) manufacturing method, without the use of a binding agent applied to the object to adhere the coating, comprising the steps of:

providing a blasting medium which contains at least in part the same plastic powder used to make the object, the blasting medium further containing a coating material to be applied to the object; and transferring the coating material to the object by blasting the surface of the object with the blasting medium to thereby mechanically transfer the coating material to the object in the absence of a binding agent.

12. The method of claim 11, wherein the blasting medium contains a second blasting element different from the plastic powder.

13. The method of claim 12, wherein the second blasting element also functions as a coating material to be applied to the object.

14. The method of claim 12, wherein the second blasting element does not comprise a coating material to be applied to the object.

* * * * *